(12) United States Patent
Primos

(10) Patent No.: US 6,575,804 B1
(45) Date of Patent: Jun. 10, 2003

(54) MANUALLY MANIPULABLE GAME CALL APPARATUS

(75) Inventor: Wilbur R. Primos, Madison, MS (US)

(73) Assignee: Primos, Inc., Flora, MS (US)

(*) Notice: Subject to any disclaimer, the term of this patent is extended or adjusted under 35 U.S.C. 154(b) by 0 days.

(21) Appl. No.: 10/011,528

(22) Filed: Nov. 5, 2001

(51) Int. Cl.⁷ ............................................. A63H 33/40
(52) U.S. Cl. ...................... 446/202; 446/193; 446/197; 446/207
(58) Field of Search ................................ 446/193, 197, 446/200, 202, 205, 206, 207, 208, 397

(56) References Cited

U.S. PATENT DOCUMENTS

| | | | |
|---|---|---|---|
| 1,484,148 A | * 2/1924 | Olt | |
| 2,544,370 A | 3/1951 | Walther | 46/180 |
| 2,583,400 A | * 1/1952 | Wade | |
| 2,608,796 A | 9/1952 | Bicocchi | 46/180 |
| 3,020,675 A | 2/1962 | Boecker | 46/180 |
| 3,029,554 A | * 4/1962 | Mobley | |
| 3,656,258 A | 4/1972 | Thomas | 46/180 |
| 3,968,592 A | 7/1976 | Piper | 46/178 |
| 4,143,485 A | * 3/1979 | Stewart | |
| 4,576,584 A | 3/1986 | Hill | 446/193 |
| 4,799,913 A | 1/1989 | Wolfe | 446/193 |
| 4,940,451 A | 7/1990 | Leady | 446/208 |
| 4,955,845 A | * 9/1990 | Piper | 446/397 |
| 5,222,903 A | * 6/1993 | Parrott et al. | 446/207 |
| 5,549,498 A | 8/1996 | Kirby | 446/193 |
| 5,577,946 A | 11/1996 | Oathout | 446/208 |
| 5,643,039 A | * 7/1997 | McIntyre | 446/208 |
| 5,803,785 A | 9/1998 | Primos, Jr. et al. | 446/207 |
| 5,910,039 A | * 6/1999 | Primos et al. | 446/207 |
| 5,975,978 A | * 11/1999 | Hall | 446/208 |
| 6,039,627 A | 3/2000 | Forbes et al. | 446/208 |
| 6,053,794 A | * 4/2000 | Weiser | 446/207 |
| 6,234,859 B1 | 5/2001 | Primos et al. | 446/207 |
| 6,328,623 B1 | * 12/2001 | Bean | 446/208 |

OTHER PUBLICATIONS

Jagersport Buttolo on–line advertisement (date unknown).
Outdoor World "Wayne Carlton's Calls Buttolo Squeeze Me Elk Call," on–line advertisement (date unknown).
Carlton's Calls "Buttolo Squeeze Me Elk Call," product packaging (date unknown).
Haydel's Game Calls, Inc., Foot Operated Deer Call (Hands Free), 2001 Product Catalog, pp. 10–11.

* cited by examiner

Primary Examiner—Derris H. Banks
Assistant Examiner—Ali Abdelwahed
(74) Attorney, Agent, or Firm—Holland & Hart

(57) ABSTRACT

A game call apparatus requires an airflow across a sound-producing reed, which may be produced by a bellows, to create a variety of sounds that simulate the sounds of wildlife animals. The game call apparatus may include, in one embodiment, a pressure point structure which engages the sound-producing reed at a reed contact location. The pressure point structure can be manually manipulated to move the pressure point structure along the reed and change the reed contact location so that the sound-producing reed gradually changes the sounds produced by the game call apparatus. The bellows may include an aperture which must be covered when the game call is used. When the game call is not being purposely used, the aperture allows air to escape when the bellows are inadvertently collapsed to prevent the game call from sounding.

60 Claims, 11 Drawing Sheets

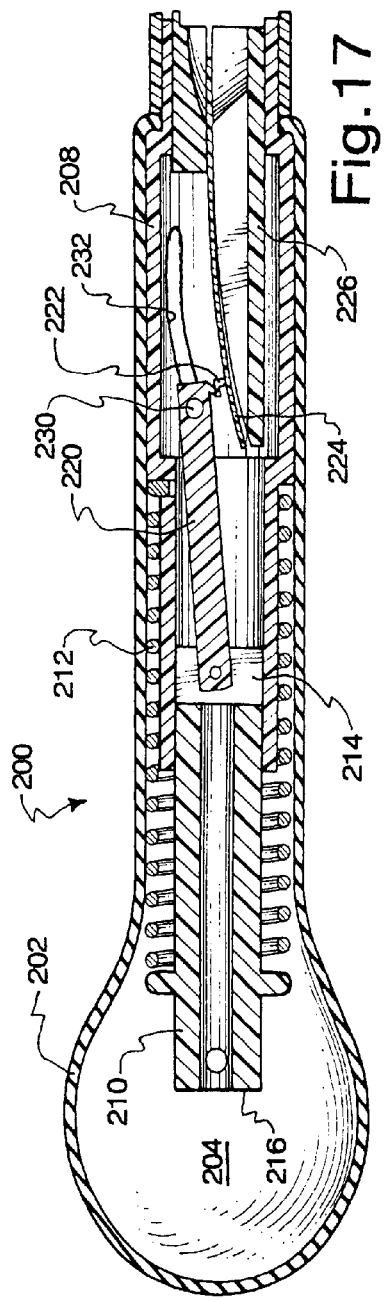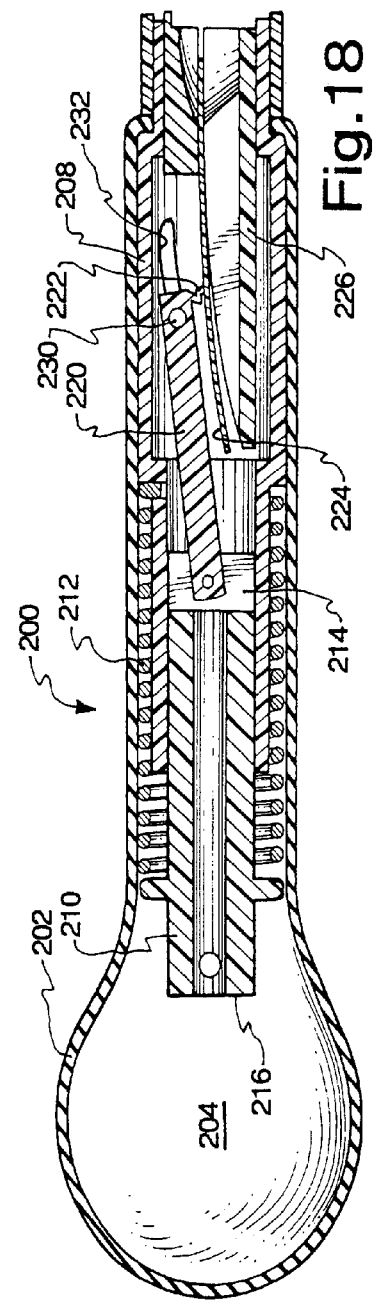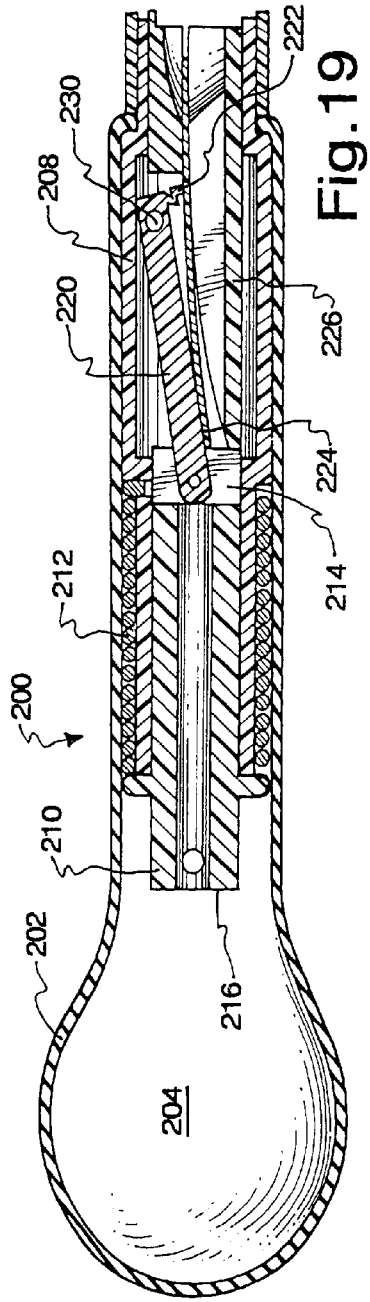

MANUALLY MANIPULABLE GAME CALL APPARATUS

TECHNICAL FIELD

This invention relates to game calls, and more particularly, to game calls for simulating sounds of wild animals.

BACKGROUND OF THE INVENTION

Game calls, which produce sounds similar to those of game or wild animals, have existed in many different forms for many years. Game calls may be utilized by hunters, wildlife watchers, and other persons who wish to simulate sounds of wild animals.

Broadly speaking, there are two primary categories of game calls that have existed over the years. One major category of game call involves the use of air, typically generated by a person blowing on the call, which is directed over a reed or diaphragm to cause the reed to vibrate and produce desired sounds. Another major category relates to friction-type game calls, which simulate the sounds of wildlife animals by the friction generated when two structural members strike each other.

In the game call industry, a primary concern, both of consumers and of manufacturers, has related to the ease with which the game calls can be used. Some types of game calls can never be mastered by a certain segment of the population. In particular, game calls which require the user to blow on the call can be difficult for many to master. Even some types of friction game calls can be difficult to master and, furthermore, cannot be used in many situations to simulate the desired sounds of wildlife animals.

With ease of use as a primary motivating factor, game calls have been developed which require neither blowing by the user nor the striking of two members against one another so friction generates a sound. An example is a game call involving a bellows, where the bellows generates the flow of air that moves across a vibrating reed to produce a desired sound. The game call apparatus described in U.S. Pat. No. 5,803,785 is an example of a bellows-type game call.

Another prior art game call which utilizes a type of bellows is the so-called Buttolo™ call which has been sold for many years in Europe. The Buttolo™ call is used to simulate the sounds of roe deer. The Buttolo™ call produces a relatively high note when the bellows are initially collapsed, followed by a distinct, second note much lower than the first high note. The second, lower note is produced when the bellows are collapsed sufficiently such that an end of a lever is engaged by the user's thumb or finger through the bellows. The lever is depressed and becomes completely disengaged from the sound-producing reed so that the reed is effectively lengthened and the lower note immediately results. This two-tone call is highly similar to the actual sounds of roe deer.

Recently, the Buttolo™ call arrived in the United States and is now being utilized in an attempt to simulate the sounds of North American elk. There are, however, problems when trying to use the European Buttolo™ call with North American elk. When North American elk are concerned about potential danger, they commonly make various types of alarm sounds (i.e., sounds suggesting to the other animals in the herd that something may not be right). Alarm sounds can vary greatly, but often involve a relatively high note followed immediately by a much lower note. The alarmed or concerned sounds can be highly similar to sounds made by the Buttolo™ call. In contrast, however, when elk are calm they make smooth and soothing "mew" type sounds which go from an initial high note and slide gradually down toward lower notes. This gradual and continuous high-to-low movement of notes provides a calming assurance to the elk that all is well.

In view of the foregoing, there is a need to develop a game call which can be easily utilized by virtually everyone to create various sounds of wild animals. More specifically, there is a need to provide a game call apparatus which is relatively easy to use and to manipulate in order to create a variety of highly precise sounds that simulate sounds of wildlife animals. Still further, there is a need to develop a game call apparatus that utilizes a bellows which can create the soothing sounds of North American elk by generating an initial high note and gradually moving toward lower notes.

OBJECTS AND SUMMARY OF THE INVENTION

It is a primary object of the present invention to provide a game call apparatus that is easy to use.

Another primary object of the invention is to provide a game call apparatus that can be easily manipulated to produce a variety of sounds to simulate sounds of wildlife animals.

Still another object of the invention is to provide a game call apparatus with a bellows for generating airflow which produces a variety of sounds highly similar to the sounds of wild animals.

Another object of the invention is to provide a game call apparatus which is manually manipulable to change the tones produced by the game call apparatus.

Yet another object of the invention is to provide a game call apparatus that utilizes a bellows to force air across a sound-producing reed to produce sounds and that also is manipulable by the user to create a variety of different sounds.

Still another object of the present invention is to provide a game call apparatus having a pressure point structure which engages a sound-producing reed and slides relative to the reed to change continuously and gradually the sounds produced by the game call apparatus.

Still another object of the present invention is to provide a game call apparatus having a bellows for generating airflow across a sound-producing reed and a pressure point structure which engages the vibrating reed and slides relative to the reed upon manual manipulation by the user to change continuously and gradually the sounds produced by the game call apparatus.

The foregoing objects are achieved by a game call apparatus that requires an airflow across a sound-producing reed, which may be produced by a bellows in a preferred embodiment, to create a variety of sounds that simulate the sounds of wildlife animals. The game call apparatus further includes a pressure point structure which engages the sound-producing reed at a reed contact location. The pressure point structure can be manually manipulated to move the pressure point structure along the reed and change the reed contact location so that the sound-producing reed gradually changes the sounds produced by the game call apparatus. The bellows may include an aperture which must be covered when the game call is used. When the game call is not being purposely used, the aperture allows air to escape when the bellows are inadvertently collapsed to prevent the game call from sounding.

Other objects, features, and advantages of the invention will become apparent from the following detailed description of the invention with reference to the accompanying drawings.

BRIEF DESCRIPTION OF THE DRAWINGS

Preferred embodiments of the invention are described below with reference to the accompanying drawings:

FIG. 1a is an isometric view, reversed 180 degrees, as compared to FIG. 1, of the bellows portion of the game call apparatus of FIG. 1;

FIG. 2a is a perspective view of the sounding board, rotated 180 degrees about its longitudinal axis as compared to the way the sounding board is shown in FIG. 2;

FIG. 2b is a perspective view of the reciprocating reed engagement member, rotated 180 degrees about its longitudinal axis as compared to the way the reciprocating reed engagement member is shown in FIG. 2;

FIG. 2c is a perspective view of the reciprocating reed engagement member of FIG. 2b, rotated 180 degrees about its longitudinal axis and rotated to view the hidden end of the reciprocating reed engagement member as compared to what is shown in FIG. 2b;

FIG. 2d is a perspective view of the wedge piece, rotated 180 degrees about its longitudinal axis as compared to the way the wedge piece is shown in FIG. 2;

FIG. 2e is a sectional view, taken along the line 2e—2e of FIG. 2, showing a section view of the inner housing;

FIGS. 17–19 are sectional side elevation views of the game call apparatus of FIG. 14 showing the sequential movement of an alternative pressure point structure along the vibrating reed to gradually and sequentially change sounds produced by the vibrating reed.

DETAILED DESCRIPTION OF THE INVENTION

Figure 1:
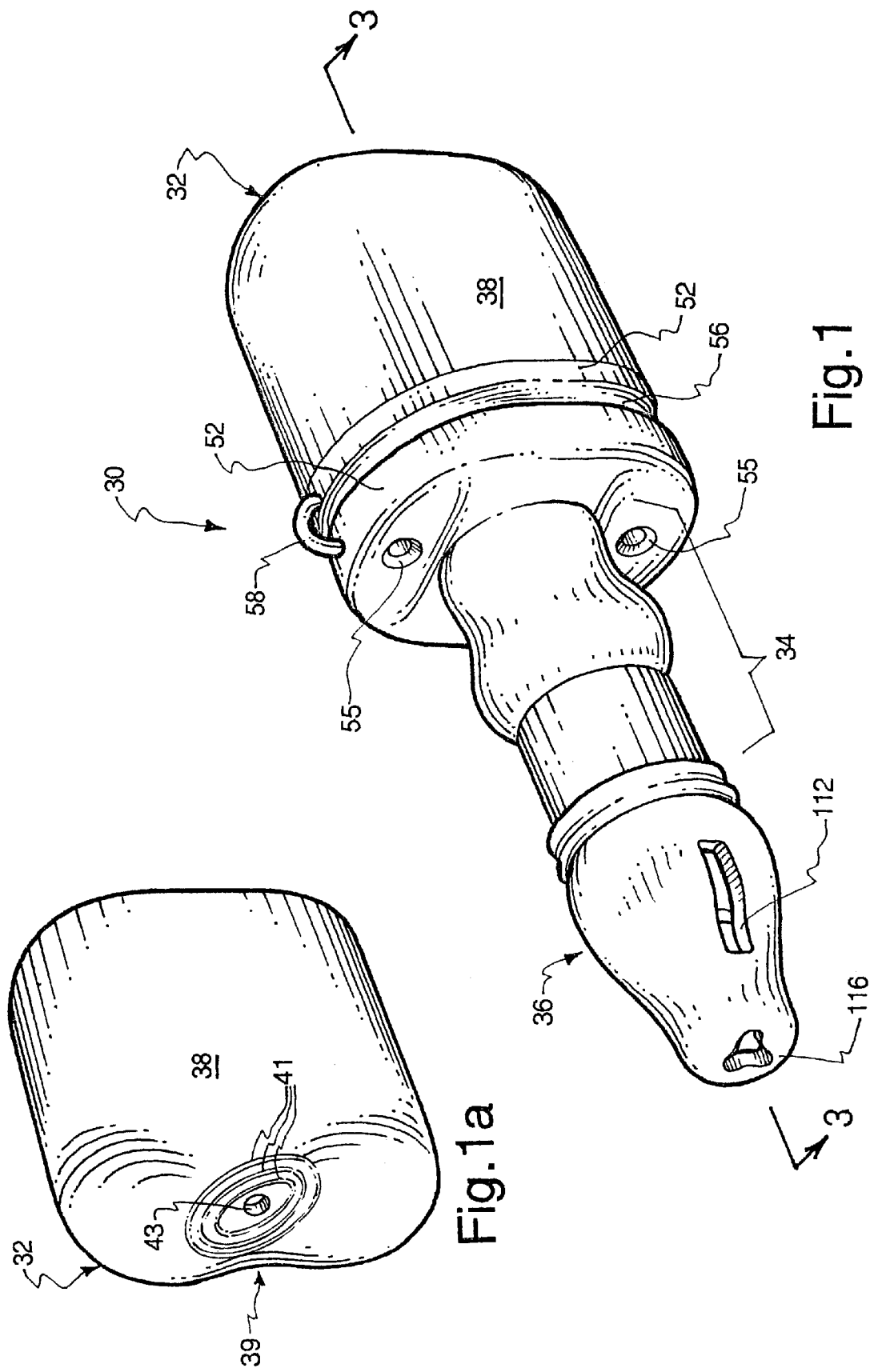
FIG. 1 is an isometric view of a preferred embodiment of the present invention.

The present invention relates generally to a game call apparatus 30 which is ideally suited for simulating sounds of North American elk. It should be understood, however, that the game call apparatus may be used for calling various wild animals, including without limitation deer, predators, birds, etc. The game call 30 generally comprises a bellows section 32, a main assembly section 34, and an enhancer section 36. In the preferred embodiment of FIG. 1, the bellows section 32 generates an air flow for passing across a sound-producing reed (discussed below) which, in turn, vibrates and produces sounds that eventually pass through the enhancer section 36 and outside of the game call.

Figure 3:
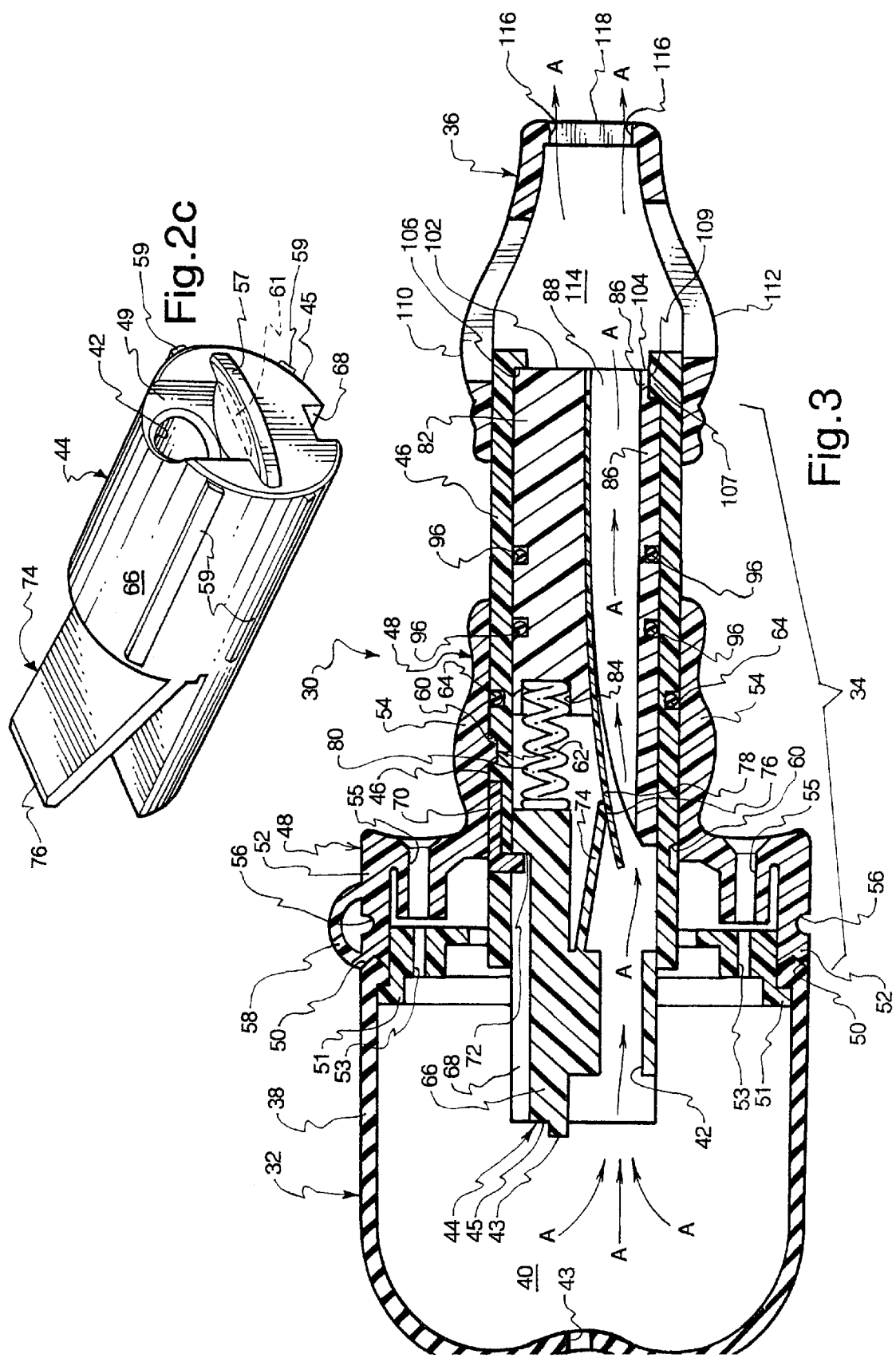
FIG. 3 is a sectional side elevation view of the game call apparatus of FIG. 1.

More specifically, as shown in FIG. 3, the game call apparatus 30 of the present invention includes a resilient collapsible outer wall 38, which may be made of Santoprene, Herculene, or another suitable material known to those skilled in the art. The outer wall 38 forms the bellows portion of the bellows section 32. The wall 38 encloses a volume of air 40 which surrounds an inlet to a passageway 42 formed in the main assembly section 34 according to the present invention. It will be understood by those skilled in the art that the outer wall 38 may be made of any suitable configuration.

A depression area 39 (FIGS. 1a and 3) is formed at the end of the bellows 38 to provide a location for the user's thumb or finger. At the depression area 39, a plurality of raised ribs 41 are formed in the top surface of the bellows wall 38. The ribs 41 are annular and generally concentric (although the ribs 41 are not perfectly circular) relative to each other. The longer dimension of the annular area defined by each rib 41 extends at an angle relative to the dimensions of the end of the bellows, which corresponds to the natural position of the thumb when using the call. Each rib 41 surrounds a central aperture 43 formed at the lowermost point in the dimple area 39. The ribs 41 assist the user to seal the aperture 43 when the user's thumb or finger is placed over the aperture 43 during normal use. When the game call is not being used, air is allowed to freely pass through aperture 43 so that if the bellows become inadvertently collapsed, air will pass through aperture 43, rather than over the sound-producing reed, and will prevent the call from making an inadvertent sound. By covering the aperture 43 during normal use, the game call will immediately sound as air is forced across the vibrating reed 78 (FIG. 3) by collapsing the bellows. An inlet to passageway 42 is formed in a reciprocating reed engagement member or reed slide 44 which is slidingly received within an inner housing 46. The inner housing 46 is received, in turn, inside an outer housing or base 48. It should be noted that the reciprocating reed-engaging member 44, the inner-housing 46, and the base 48 may all be made of any suitable material know to those skilled in the art, such as ABS.

Figure 2:
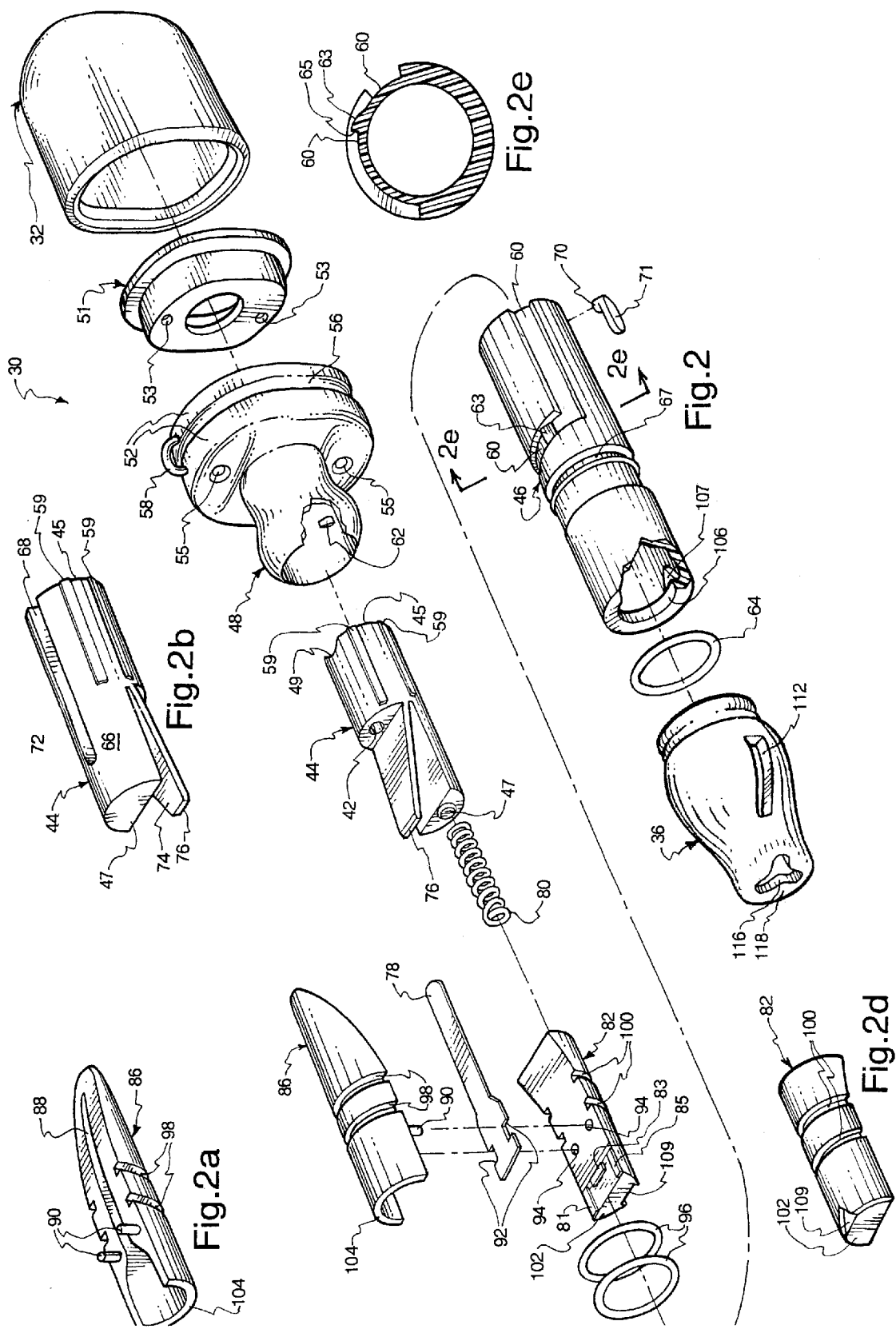
FIG. 2 is an exploded perspective view of the game call apparatus of FIG. 1.

With reference to FIGS. 1–3, one embodiment of the present invention comprises a bellows section 32, which more specifically comprises a soft collapsible wall 38. With reference to FIG. 3, the outer wall 38 is preferably made of a generally uniform thickness. It is to be understood, however, that walls having various thicknesses may be utilized in connection with the present invention. Furthermore, walls that are collapsible in other ways (e.g., accordion-type bellows) may be utilized in connection with the present invention.

As shown in FIG. 3, the resilient wall 38 is coupled to the base 48 at abutment location 50. The base 48 and bellows 38 are held together by a retainer plate 51 which includes apertures 53 which are concentrically aligned with apertures 55 formed in the base 48. Appropriate fasteners, such as screws, are inserted through apertures 55 in base 48 and, subsequently, threadedly received by apertures 53 formed in retainer plate 51. Other suitable methods of coupling the outer wall 38 to the rigid outer housing 48 will be known to those skilled in the art. The base 48 comprises an enlarged outer section 52 adjacent bellows 38, and a relatively narrower section 54 into which inner housing 46 is inserted. An annular groove 56 is formed in the outer section 52 to accommodate a lanyard or other similar device for facilitating transportation of the game call apparatus 30. To ensure that the lanyard does not become separated from the game call apparatus 30, one or more loops or bridging structures 58 may extend over the annular groove 56. Structure 58 functions similar to a belt loop in that it holds the lanyard in position about the enlarged outer section 52 of the base 48. The surface areas adjacent apertures 55 are preferably concave to accommodate the user's fingers during normal use of the game call apparatus 30.

The inner housing 46 (FIGS. 2 and 3) is rotatably received within the narrowed section 54 of base 48. A groove 60 is formed in the inner housing 46. Groove 60 begins at one end as a straight groove, and begins to spiral as it moves toward the front end of housing 46 (as shown in FIG. 2). At the beginning of the spiraled portion of groove 60, a ramp 63 (FIG. 2e) is provided so that a protuberance or appendage 62 (FIGS. 2 and 3) integrally formed in the base 48 must ride up and over the ramp 63 during assembly of the call. The ramp 63 includes a straight back wall 65 which provides a stop for protuberance 62 when the user attempts to rotate the inner housing 46 relative to the base 48 beyond the location of ramp 63. The spiraled portion of groove 60 allows inner housing 46 to move longitudinally relative to the base 48 as inner housing 46 is rotated relative to the base 48. The back wall 65 has a height which will allow the protuberance 62 to overcome the height of the back wall when sufficient torsional force is placed on the inner housing 46 and base 48, respectively, so that the two parts can be disassembled, but these parts will remain operatively together during normal use of the game call. The integral protuberance 62 formed in the base 48 allows consistent relative rotation between base 48 and inner housing 46 for desired longitudinal movement of the two part relative to one another. Such relative longitudinal movement changes the distance between the end wall 45 (FIG. 3) of the reciprocating reed engagement member 44 and the inside surface of the flexible bellows wall 38 so the game call is capable of creating different sounds (i.e., shorter, longer, or different tones) with the game call apparatus 30. The greater the distance between end wall 45 and the bellows wall 38, the longer the sounds will be when utilizing the game call.

A substantially air-tight seal should preferably be provided between the base 48 and the inner housing 46 so that most, if not all, of the air passing through the game call apparatus 30 passes over the reed. A groove 67 (FIG. 2) is formed in the inner housing 46 to receive an appropriately sized O-ring 64 to provide such a substantially air-tight seal between the base 48 and the inner housing 46.

As shown in FIGS. 2c and 3, the reciprocating reed engagement member 44 includes, as mentioned previously, a rear engagement surface 45 which is intended to be engaged by the thumb or finger of the user of the call through bellows section 32. Upon collapsing the bellows 38 to a certain degree, the user's finger or thumb will contact the back wall 45 through the bellows. An aperture 42 formed in the reciprocating reed engagement member 44 (the inlet of which is shown in FIG. 2c) provides a central passageway for an airflow A to pass through the game call device (appropriate arrows adjacent to airflow A are shown in FIG. 3). The reciprocating reed engagement member further comprises a main body 66, which is generally cylindrical in shape. The main or central passageway 42 is formed in main body 66. A keyway or slot 68 is also formed in the main body 66 which corresponds to a stop pin 70 inserted through an appropriately sized aperture in the inner housing 46. Stop pin 70 extends into the keyway or slot 68. Stop pin 70 further includes a tail portion 71 which rides inside an appropriately sized cavity in the housing 46 to prevent the pin 20 from rotation or becoming displaced. When the game call is in a "rest" position, the stop pin 70 engages an end or abutment wall 72 formed in the key slot 68 (because of the force exerted by bias member 80—FIG. 3) so that the reciprocating reed engagement member 44 is held in a nested orientation inside inner housing 46.

To allow appropriate relative movement between the reciprocating reed engagement member 44 and inner housing 46, a plurality of rails 59 (FIGS. 2, 2b, and 2c) are formed on the outside surface of member 44. Rails 59 reduce the friction between member 44 and inner housing 46 and prevent any binding up between these two structural elements. Rails 59 also serve to maintain the edge 76 (FIGS. 2 and 2b) in a proper orientation for engagement with reed 78. It should be noted that the dimensions of the rails 59 are such that an appropriate amount of airflow A is directed over the reed.

The reciprocating reed engagement member 44 includes a tongue or pressure point structure 74 which extends at an angle (any suitable angle) from the main body 66 of the reciprocating reed engagement member 44. The pressure point structure 74 includes a lip or edge 76 which is intended to engage-a vibrating reed 78 (discussed in greater detail below) held inside the passageway allowing airflow A to pass through the call. The pressure point structure 74 engages the reed at a reed contact location. This reed contact location will define a free end of reed 78 (i.e., the amount of reed extending in a cantilevered-type manner beyond the reed contact location). As discussed in greater detail below, the lip or edge 76 of the pressure point structure 74 is designed to slidingly engage the reed 78 to gradually change tones produced by the reed 78. These gradual change in tones relate to the length of the free end of the reed 78, as well as the relative position between the reed and the sounding board 86.

The reciprocating reed engagement member 44 is biased toward a free end of the reed 78 by means of a bias member or spring 80. The spring 80 is positioned between the reciprocating reed engagement member 44 and a wedge piece or retainer 82 secured within the inside housing 46. The spring 80 is inserted over a protuberance or boss 47 (FIGS. 2 and 2b) formed on the reciprocating reed engagement member 44. An aperture 84 (FIG. 3) formed in wedge piece 82 is sized to receive and retain spring 80, even when the reciprocating reed engagement member 44 is removed from the main assembly section 34. The wedge piece 82 acts in combination with the sounding board 86 to secure between them the vibrating reed 78. The sounding board 86 defines a channel 88 on top of which the reed 78 is operatively coupled. Air A passes through channel or passageway 88 causing reed 78 to vibrate and make sounds similar to wildlife animals.

As shown in FIG. 2, the wedge piece 82 includes a plurality of bosses or raised surfaces 81, 83, and 85. Bosses 81 and 85 bear against the corresponding walls of sounding board 86 to ensure that the wedge piece 82 and the sounding board 86 are properly oriented relative to each other and that the reed 78 is held properly. Boss 83 may provide an engagement surface for the back end of reed 78. That is, the back end of reed 78 (i.e., the end opposite the free end that vibrates and is cantilevered beyond the end of wedge piece 82) may be positioned to bear against an edge of boss 83 so that the reed 78 can be positioned at a known location, particularly during initial assembly. Alternatively, reed 78 may be positioned so that the back end of the reed 78 rests on top of boss 83.

The combined wedge piece 82, reed 78, and sounding board 86 are held together, as shown in FIG. 2, by a reed relocation system, which comprises a pair of posts 90 (FIG. 2a) formed in the sounding board 86 which extend through corresponding cut-out areas 92 in the reed 78 and, subsequently, into appropriately sized apertures 94 in wedge piece 82. The reed 78 can be longitudinally adjusted within the longitudinal limiting range of slots or cut-out areas 92. Thus, precise relocation of the reed 78 can be accomplished after the assembly has been taken apart. A pair of O-rings 96 holds the entire reed-sounding board-retainer assembly together. The O-rings 96 rest inside of a pair of first grooves 98 formed in the sounding board and a pair of second grooves 100 formed in the wedge piece.

In assembly, as shown in FIG. 3, after wedge piece 82, reed 78, and sounding board 88 have been assembled and are held together by O-rings 96, the assembled unit is inserted into the inner housing 46 until the forward end of the assembly (reference numerals 102 (wedge piece) and 104 (sounding board)) abut an annular wall 106 formed in the inner housing 46. To ensure proper alignment, a V-shaped shoulder 107 (FIGS. 2 and 3) is integrally formed in the inner housing 46 and a V-shaped slot 109 (FIGS. 2 and 2d) is formed in the wedge piece 82. The shoulder 107 and the slot 109 have corresponding shapes and sizes so that when the assembly of the wedge piece/reed/sounding board is inserted into inner housing 46, the two mating V-shaped members align and properly orient the respective game call parts.

A spring 80 is subsequently inserted through aperture 84 in wedge piece 82, after which the reciprocating reed engagement member 44 is inserted into the inner housing. The stop pin 70 is finally positioned in its proper place to secure the reciprocating reed engagement member 44 inside the call.

The enhancer section 36 is inserted over the outlet end of the game call apparatus. The enhancer or tone modifier 36 enables adjustment of the tones produced by the call as desired. The enhancer 36 also creates back pressure for more controlled sounds. A pair of staggered apertures 110, 112 are formed in the side walls of the enhancer 36 (see FIG. 3). The side apertures 110, 112 can be at least partially enabled or disabled depending on the location of the enhancer 36 relative to the inner housing 46. The enhancer 36 can be moved relative to housing 46 to cover portions of apertures 110 and 112. Air A passing from the main channel 88 (FIG. 3) enters into the volume chamber 114 of the enhancer 36 and, ultimately, through an end exit aperture 116 formed in the distal end wall 118 of the enhancer section 36. In operation, side apertures 110, 112 can be selectively covered during operation to change the sounds or tones produced by the call. Alternatively, as discussed above, side apertures 110, 112 can be at least partially disabled by sliding the enhancer section 36 down further onto inner housing 46. The amount of air that will exit through side apertures 110, 112 will depend upon the extent apertures 110, 112 are exposed. The air exiting the game call will, therefore, pass through side apertures 110, 112, and end aperture 116 of the enhancer section 36.

With reference to FIG. 2, additional details of the reciprocating reed engagement member 44 are shown. The reciprocating reed engagement member is intended to simulate the way a person's lip slides along the reed in certain types of convention game calls to make sliding or gradually changing sounds. The tongue or pressure point structure 74 includes the reed-engaging surface 76. The reed-engaging surface 76 can be a raised lip, a tapered surface (as shown in FIG. 2), or any other suitable surface for interfacing, engaging, and slidably contacting the reed 78. As shown in FIG. 2, the pressure point structure 74 is tapered with its narrower portion being located toward reed-engaging surface 76 and the broader portion being integrally secured to the main body of the reciprocating reed-engaging member. The pressure point structure 74 has a width which corresponds substantially (i.e., it could be slightly narrower or slightly wider) to the width of the reed 78.

As further shown in FIG. 2, the rear end of the reciprocating reed-engaging member 44 includes a back surface 75 which can be contacted by a finger through the flexible bellows 38 (FIG. 3). A raised surface or rib 57 may be incorporated into the back wall 45 so that the finger or thumb or the person using the call will first preferably contact the raised surface 57 and not block aperture 42. Still further, a recessed area immediately adjacent inlet 42 is defined by a curved or sloping wall 49. The rib 57 and the curved, sloping wall 49, particularly in combination, will prevent the user's finger or thumb from blocking air which needs to flow through passageway 42 to pass downstream across the reed 78 and the sounding board 86 to create sounds pursuant to the game call apparatus. If necessary, material (shown in dashed lines and indicated by reference numeral 61 in FIG. 2c) adjacent rib 57 can be removed so a space is provided behind the rib 57 to further facilitate the flow of air into aperture 42.

Figure 4:
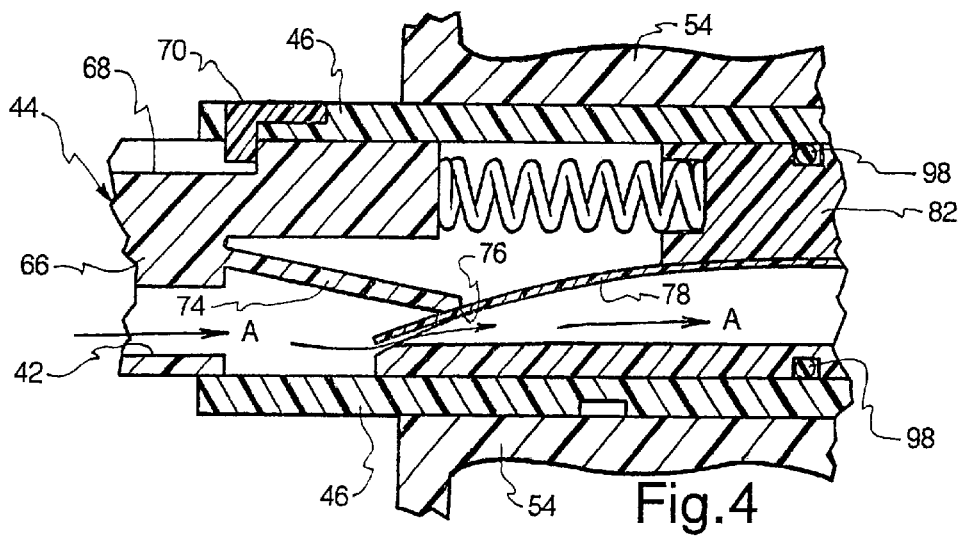
FIGS. 4–6 are enlarged, sequential sectional side elevation views of the interior portion of the game call apparatus of FIG. 1 showing the reciprocating engagement member slidingly engaging the reed at various reed contact locations to change the sounds produced by the reed according to the present invention.
Figure 5:
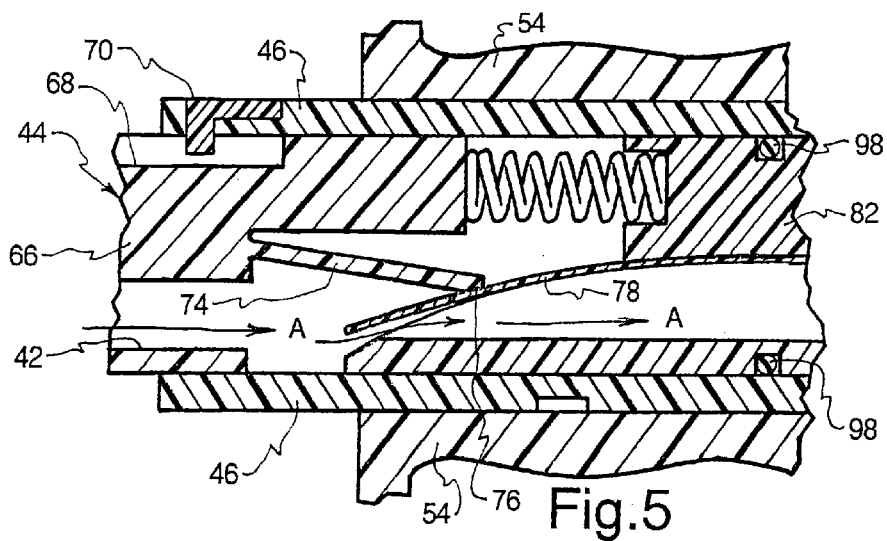
Figure 6:
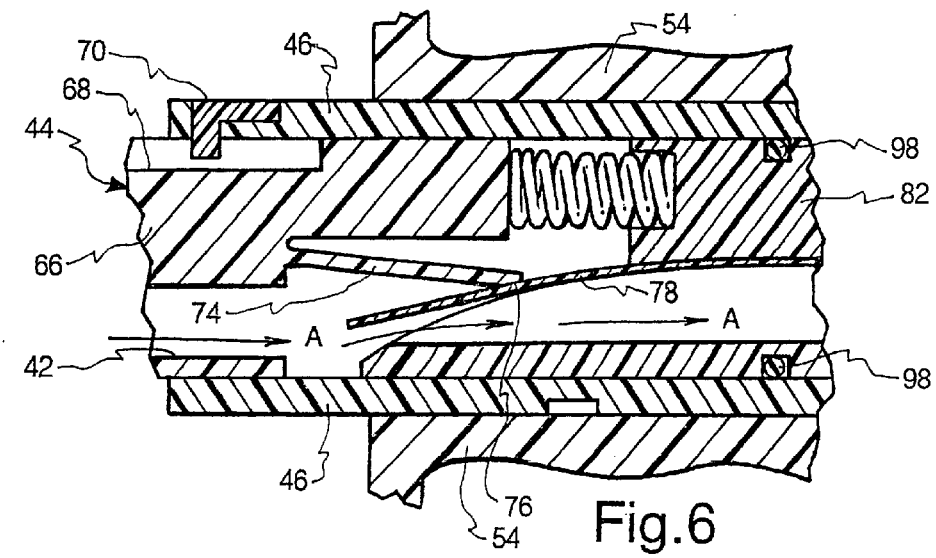

As shown in FIGS. 4–6, a series of sequential diagrams of the game call apparatus is shown. In the normal or rest position (FIG. 4), surface 76 of the pressure point structure 74 extending from the reed-engaging member 44 contacts the vibrating reed 78 at an initial reed contact location. As air is forced across reed 78, by collapsing the bellows 38 (FIGS. 1 and 2), the person's finger or thumb will ultimately engage the back wall 45 of the reciprocating reed-engaging member 44. As the finger or thumb of the user depresses the reed-engaging slide or member 44, the pressure point structure 74 is thrust forward relative to the other structures of the call and the edge or lip 76 of the pressure point structure 74 slides along the reed 78 so that different sounds are gradually and continuously produced by the reed. The pressure point structure 74 is designed using a material known to those skilled in the art which will flex, if necessary, to accommodate the slope of the top surface of sounding board 86 while the structure 74 slidingly engages reed 78. The pressure point structure 74 is shown in a intermediate position (i.e., the lip or edge 76 is contacting the reed 78 at an intermediate reed contact location), and FIG. 6 shows the edge or lip 76 contacting the reed 78 at an end or final reed contact location. It is to be understood that the initial reed contact location (shown in FIG. 4) and the end reed contact location shown in FIG. 6 can be varied by changing the structural aspects of the call. Between the initial reed contact location shown in FIG. 4 and the end reed contact location shown in FIG. 6, the edge 76 of the pressure point structure 74 contacts the reed in a sliding manner at an infinitely variable number of reed contact locations. During this process, the effective length of the reed or the free end of the reed 78 changes and becomes longer as the pressure point structure 74 moves toward the fore end of the call. This changes the notes from an initial "high" note gradually toward lower notes, which is similar to the natural calming sounds made by elk and other wild animals.

A primary purpose of a game call according to the present invention is to create realistic sounds of wild animals. In particular, as mentioned, the gradual high-to-low sounds of elk (without limitation) may be made utilizing a game call apparatus according to the present invention. To be realistic, the high-to-low sounds should be gradual and require that a pressure point structure contact the reed in a continuous yet sliding manner at various locations along the reed. These contact locations must be infinitely variable between the initial high note and the lowest note to produce a continuous stream of different sounds, tones, or notes, either from high to low or low to high.

As an alternative to the preferred embodiment shown in FIGS. 1–6, the call could be modified to simulate the sounds of deer, predators, or any other type of animal. As an example, if a deer grunt call is desired, the call could be modified by shortening the wedge piece 82 (e.g., the wedge piece could be cut to approximately ¼ of the length shown in FIGS. 1–6) so that the effective length of the reed would be extended. In one embodiment, the reed length for a deer grunt call would be approximately between 19/32 inches to 2 inches. Such an effective length of reed 78 would result in a low note which could be adjusted to simulate a deer grunt. In comparison, reed 78 of the preferred embodiment shown in FIGS. 1–6 has a potential length (i.e., the cantilevered portion extending beyond wedge piece 82) of approximately 23/32 inches to 25/32 inches. The extended length of the reed 78 would allow a grunt sound to be produced. It should be noted that producing a grunt sound would not necessarily require a pressure point structure, as in the preferred embodiment.

Figure 7:
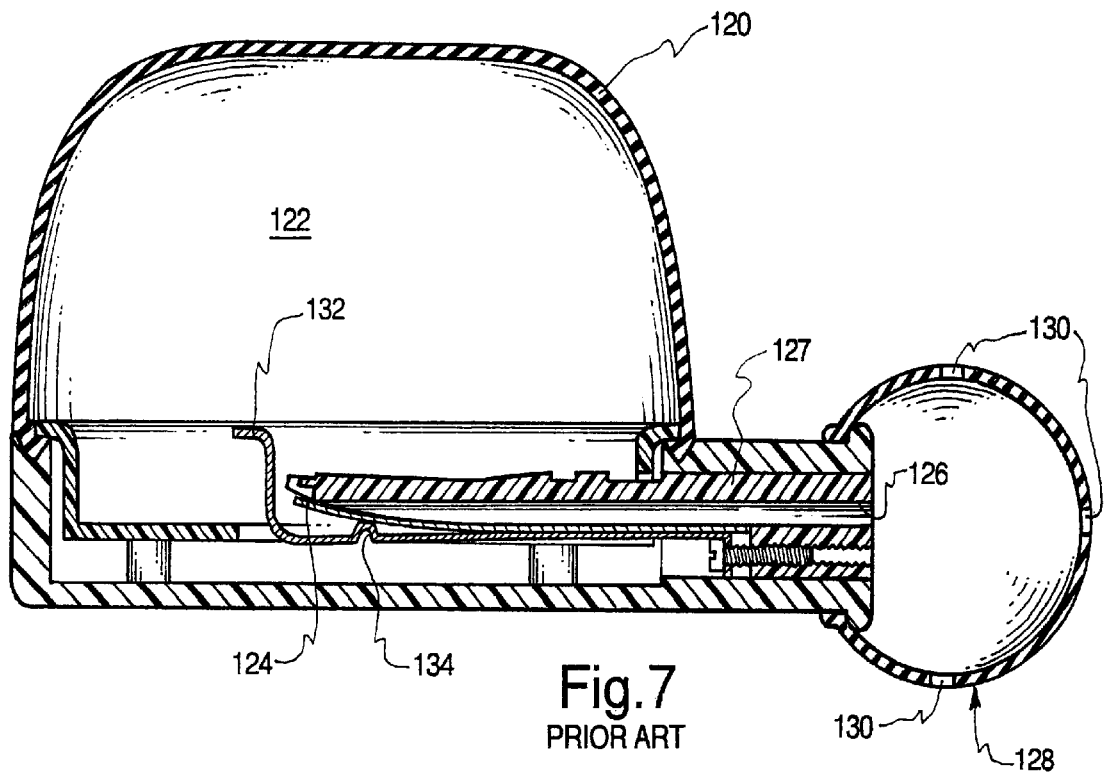
FIG. 7 is a prior art game call apparatus.
Figure 8:
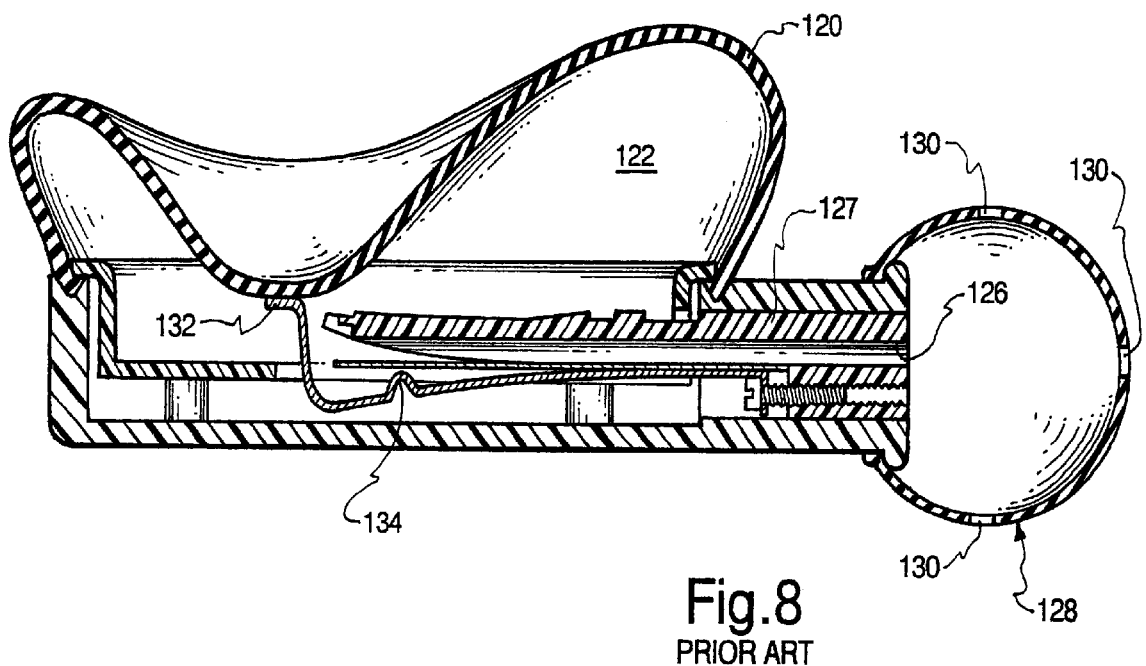
FIG. 8 is the prior art game call apparatus of FIG. 7 in operation.

FIGS. 7 and 8 show a prior art Buttolo™ call, which has been manufactured and sold in Europe for many years. The Buttolo™ call has been used as a roe deer call. As shown, a bellows 120 is included which defines an air space 122. When the bellows are collapsed, air is forced across a reed 124 (held by pressure point structure 134 in a fixed position) and through an exit aperture 126 formed in the sounding board 127 of the call, and ultimately through an enhancer 128 and one or more of its exit openings 130. As the bellows are collapsed, the call produces a first sound. By further depressing the bellows 120 (FIG. 8), a cantilevered resilient arm 132 is depressed and its pressure point structure 134 is released from holding the reed in position against the sounding board 127 so that the effective length of the reed is extended and the sound drops. Unlike the present invention, however, the sound steps dramatically from a high note directly down to a low note. Only two main notes are produced. There is no gradual movement of the sound from the high note to the low note. As mentioned, these two notes can simulate alarm or concerned sounds of elk, which would indicate to others in the herd that something may not be right. Thus, the Buttolo™ call can be counterproductive in the field.

Figure 9:
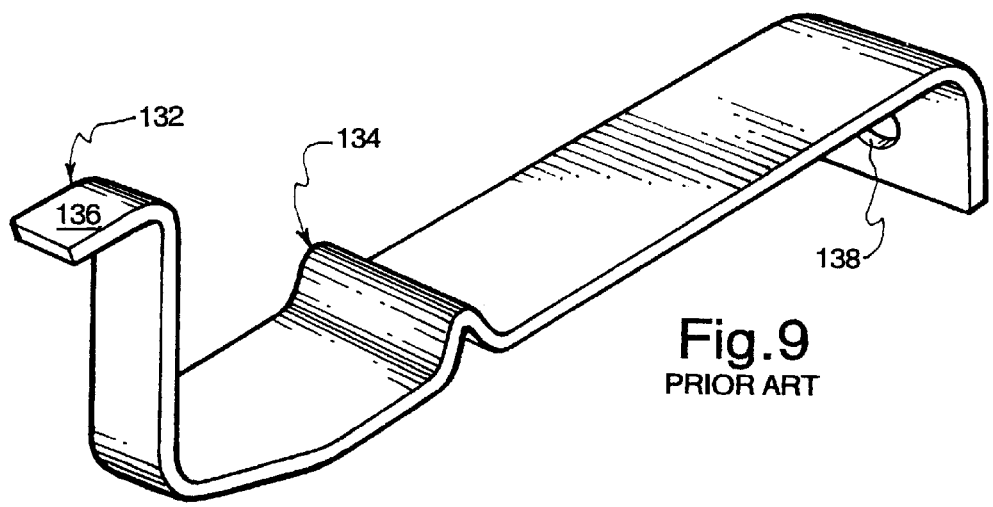
FIG. 9 is a perspective view of a prior art cantilevered arm having a contact point for engaging the vibrating reed.

FIG. 9 shows the prior art Buttolo™ cantilever or cantilevered structure 132, which includes a reed engagement location 134. A surface 136 of the arm 132 is contacted by the user's finger through the bellows 120 (FIGS. 7 and 8). When the cantilevered arm 132 is depressed, the cantilevered arm 132 pivots about mounting location 138 so that the reed contact location 134 becomes disengaged from the reed (FIGS. 7 and 8).

Figure 10:
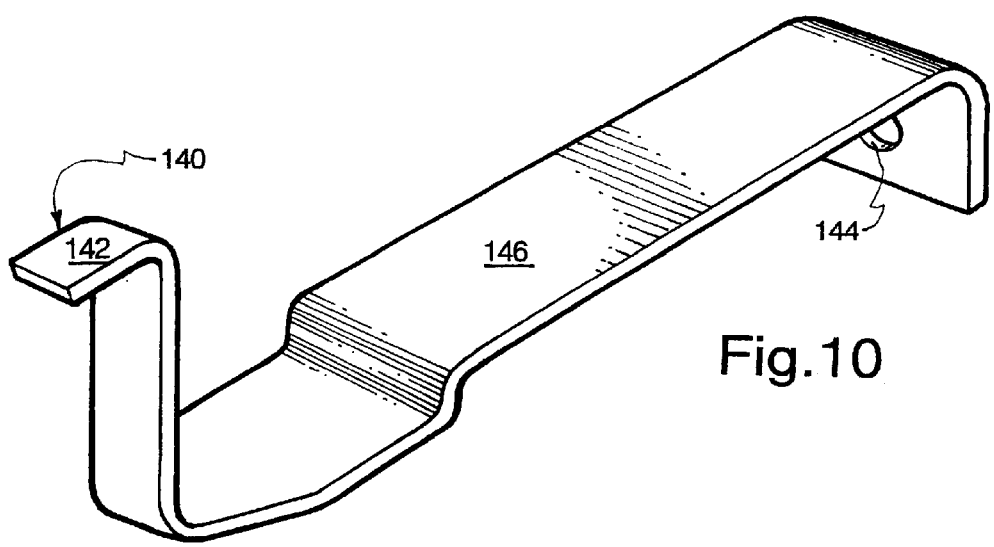
FIG. 10 is a perspective view of one embodiment of an improved cantilevered arm to gradually and sequentially engage and disengage a vibrating reed to change the sounds produced by the vibrating reed according to the present invention.

To prevent an immediate and final disengagement between a cantilevered arm and the reed alternative embodiments (FIGS. 7 and 8) have been developed. A first alternative embodiment is a cantilevered arm 140 shown in FIG. 10. The cantilevered arm 140 comprises a surface 142 which is contacted by a user's finger through the bellows 120 (FIGS. 7 and 8). Gradually the arm 140 will cause it to slowly articulate about mounting location 144 and gradually disengage from its contact at surface 146 with the reed. Rather than having a single reed contact location as with the prior art (FIG. 9), the entire top surface 146 of the cantilevered arm will engage the entire length of the reed (FIGS. 7 and 8) so that gradual depression of cantilevered arm 140 will gradually and continuously change the effective length of the reed and, therefore, gradually change the sounds made by the call from high notes to low notes. It should be understood that the reed assembly could be changed to go from low notes to high notes by making adjustments to the call. That is, the cantilevered end could be moved 180 degrees and the reed contact location could move so that the effective length of the reed is gradually decreased. This would result in a call that goes from low notes to high notes.

Figure 11:
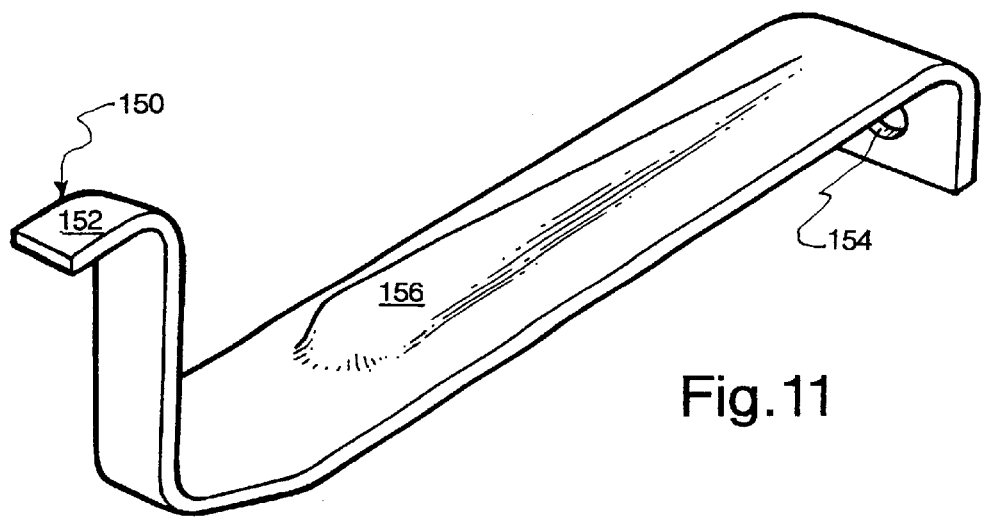
FIG. 11 is another alternative embodiment of a cantilevered arm with a tapered surface to gradually and sequentially engage and disengage a vibrating reed to change the sounds produced by the vibrating reed according to the present invention.

A second alternative embodiment of a cantilevered arm is shown in FIG. 11. A cantilevered arm 150 includes a surface 152, which is depressed by a user through the bellows 120 (FIGS. 7 and 8). The cantilevered arm 150 is mounted to the game call at mounting location 154. A raised, sloping surface 156 is provided on the top surface of the cantilevered arm 150. The raised sloping surface 156 engages the entire length of the reed such that when the engagement area 152 is gradually depressed, the sloping surface 156 gradually changes its contact point relative to the reed.

Figure 12:
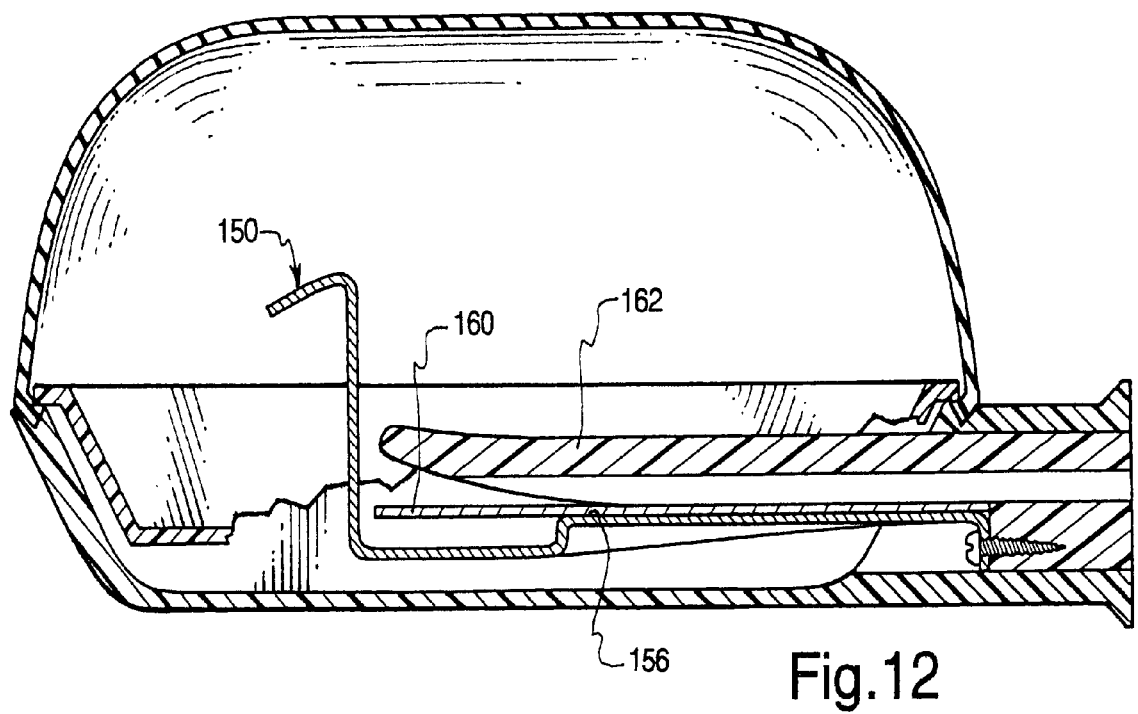
FIG. 12 is a sectional side elevation view of a game call apparatus utilizing the cantilevered arm shown in FIG. 11 in full engagement with the vibrating reed.
Figure 13:
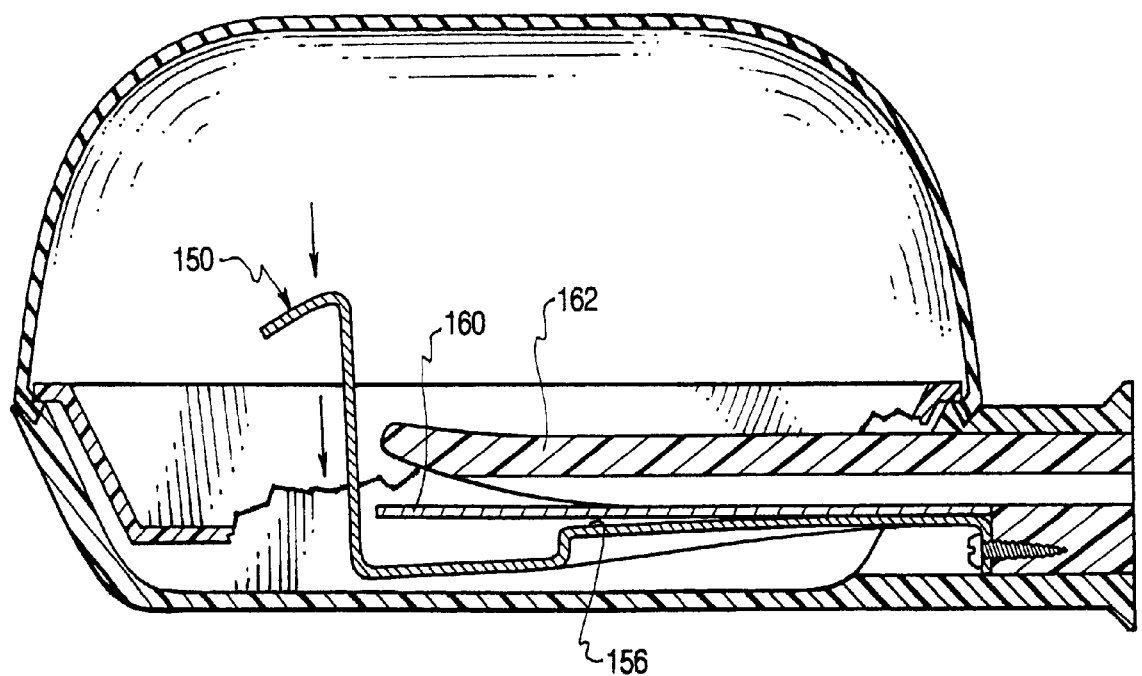
FIG. 13 is a sectional side elevation view of a game call apparatus utilizing the cantilevered arm of FIG. 11 partially disengaged from the vibrating reed to change the sounds made by the vibrating reed.
Figure 14:
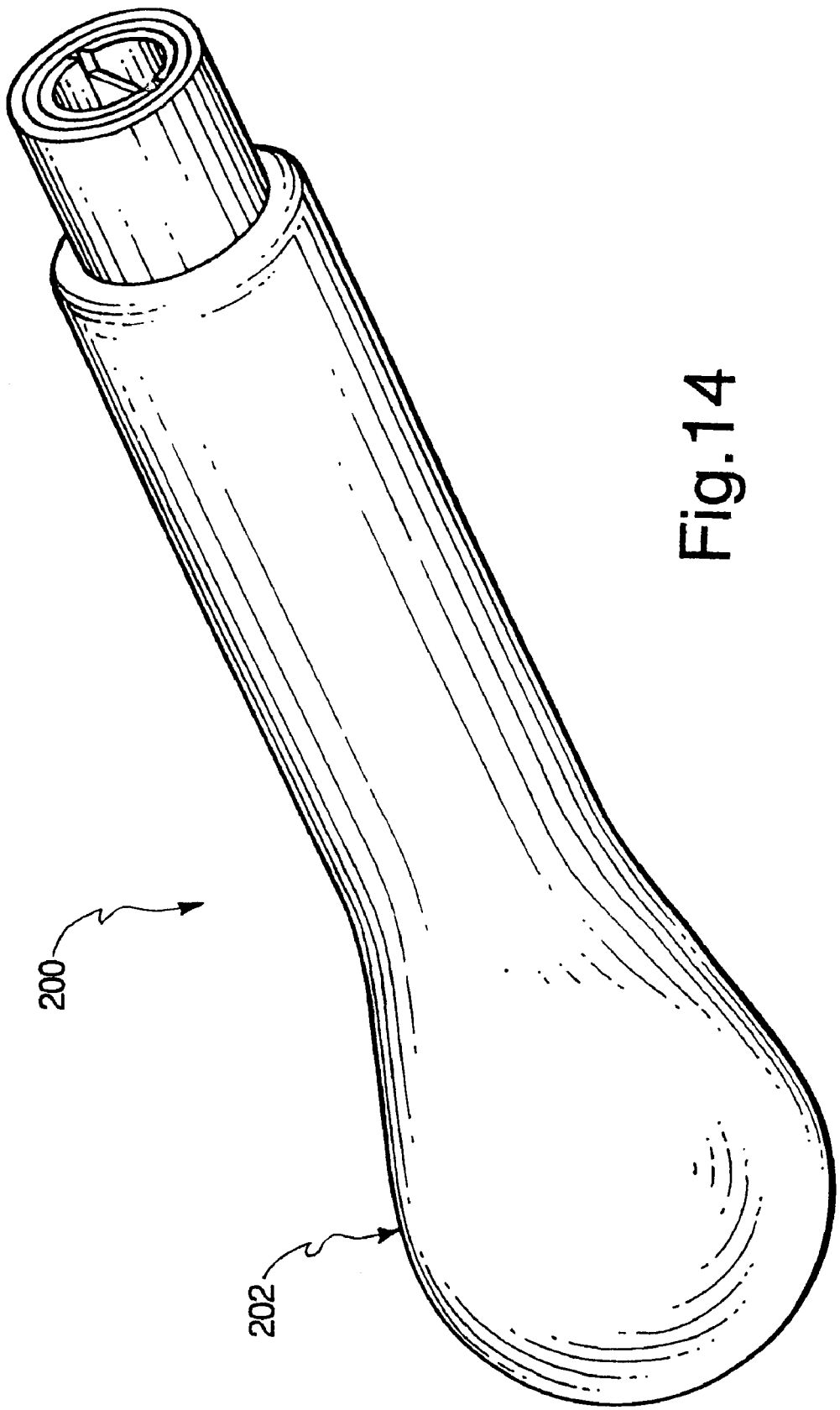
FIG. 14 is a perspective view of yet another alternative embodiment of a game call apparatus according to the present invention.
Figure 15:
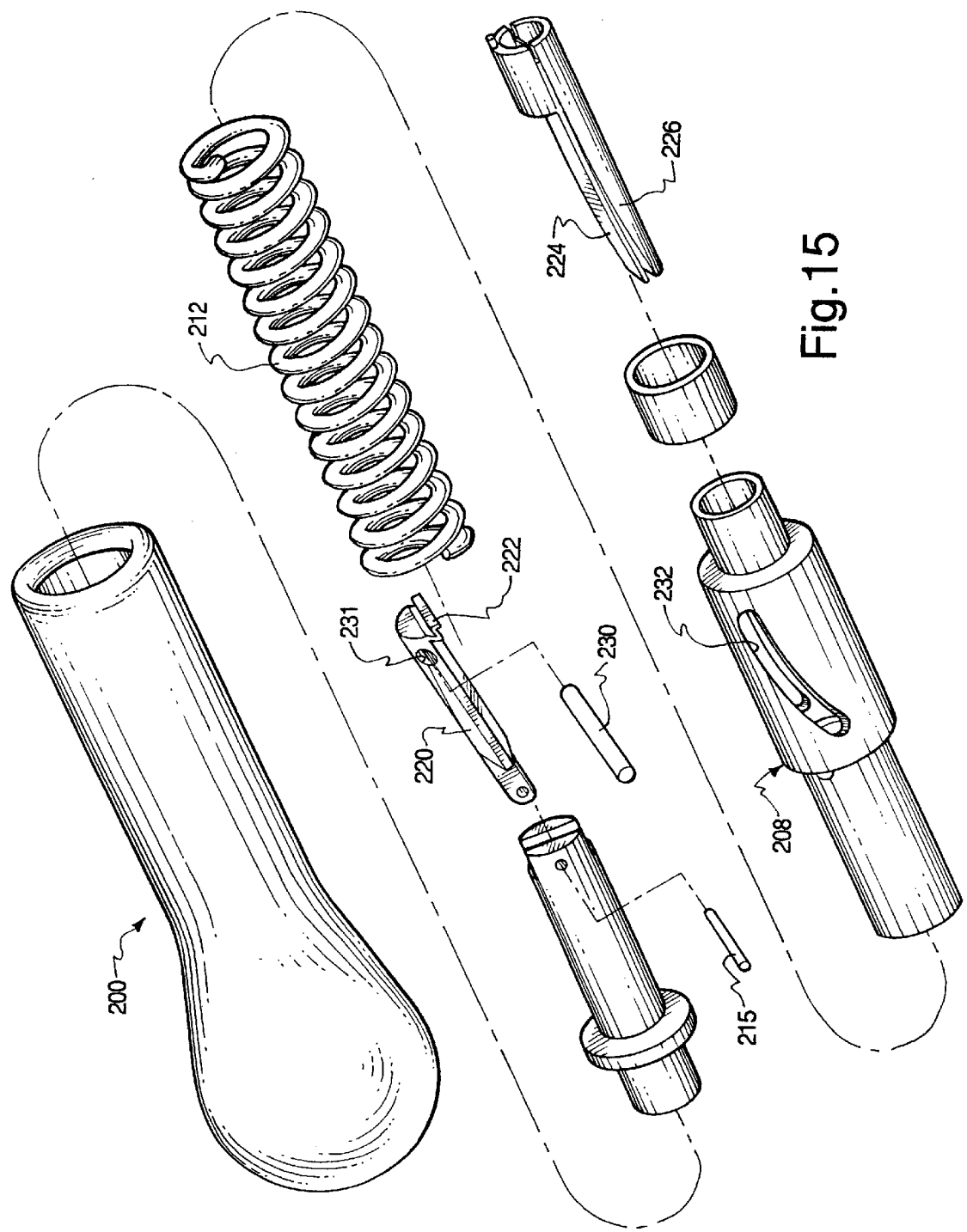
FIG. 15 is an exploded perspective view of the game call apparatus of FIG. 14.

Operation of the embodiment showing cantilevered arm 150 is shown in FIGS. 12 and 13. When surface 152 of the cantilevered arm 150 is depressed, the reed contact point moves gradually along the reed 160 such that the effective length of the reed 160 gradually changes, as well as the contact location between reed 160 and sounding board 162. Thus, rather than making a first sound and dropping abruptly off to a second, much lower note, as with the prior art (FIG. 7 and 8), the embodiment of FIG. 12 and 13 will allow for a gradually decreasing sound as the bellows 120 force air across reed 160 and through the main air channel passing through sounding board 162.

Yet another alternative embodiment to the present invention is shown in FIGS. 14–19. Although the alternative embodiment shown in these figures includes structural elements that are different from the structural elements shown and described with respect to the embodiments previously addressed, the general concept remains the same. That is, the embodiment shown in FIGS. 14–19 provides a pressure or contact point structure for engaging the reed that moves or slides gradually along the reed to change the reed contact location, and thus the effective length of the reed, as air passes by the reed to change gradually the tones produced by the reed.

Figure 16:
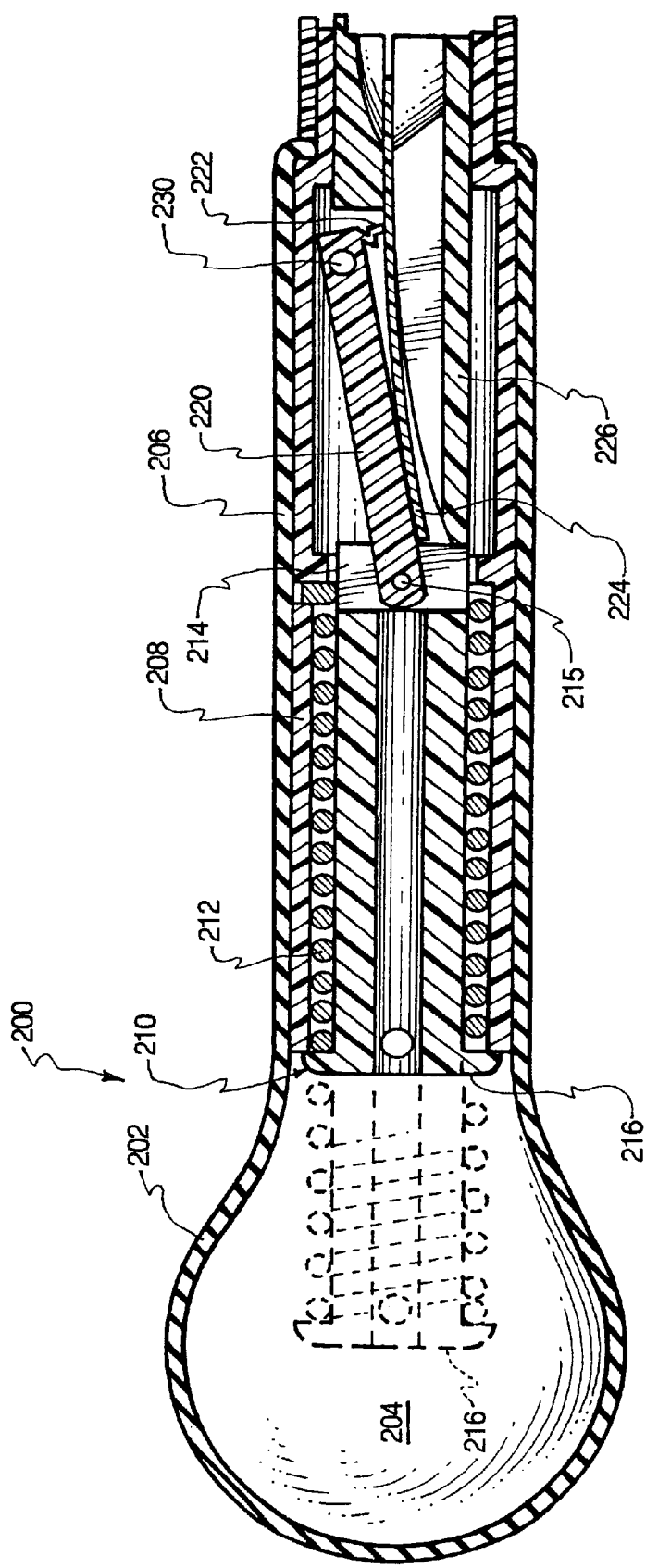
FIG. 16 is a sectional side elevation view of the game call apparatus of FIG. 14.

With specific reference to FIGS. 14–19, a game call apparatus 200 is shown, which comprises a bellows 202 which provides an enclosed air space 204 (FIG. 16). The bellows 202 further comprises a boot portion 206 which extends over a tubular housing 208 which holds or to which is attached the several elements comprising the game call apparatus 200. An oscillating plunger element 210 is nested inside housing 208. The plunger element 210 is biased outwardly by a bias member or coil spring 212. A piston 214 is attached to the distal end of plunger element 210. The plunger element 210 further comprises an engagement surface 216 which is engaged by the user of the game call upon collapsing the bellows 202 such that the bias of coil spring 212 is overcome and the piston 214 is forced downwardly through the housing for actuating the movable pressure point attached thereto (discussed below).

FIG. 16 shows the plunger element 210 in a depressed position, with the plunger 210 in its normal position shown in dashed lines.

A pivoting arm or pressure point structure 220 is pivotally attached to piston 214 by a pin 215. A lip or edge 222 is formed on the end of pivot arm 220. The lip 222 is designed to engage and span the substantial width of a reed element 224, which is operatively positioned about a sounding board 226. When air passes over reed 224, the call produces sounds.

So that the lip 222 can be reciprocated back and forth along reed 224 while exerting pressure on reed 224, a pin 230 is inserted through aperture 231 formed in the pivot arm 220, and is positioned to ride inside slot 232 of housing 208. The extent of reciprocation of the pivot arm 220 will be limited to the length of slot 232 formed in housing 208. This embodiment requires a type of dual hinge to allow the lip 222 to put the appropriate pressure on reed 224.

FIGS. 17–19 show operation of the game call. FIG. 17 shows the game call in the "rest" position, with the lip of the pressure point structure being in an initial reed contact location. As shown, the lip or edge 222 engages the reed 224 at the initial reed contact location where the reed has a relatively short effective length. As the bellows are collapsed (FIGS. 17–19 do not show the bellows being collapsed), the plunger 210 is forced inside of the game call apparatus 200 by placing force upon engagement surface 216. As the plunger 210 moves, the piston urges the pivoting lever arm 220 such that the lip or edge 222 slides along the reed to increase the effective length of the reed. An intermediate reed contact location is shown in FIG. 18, and a final or end reed contact position is shown in FIG. 19. Thus, the game call apparatus will go from a high note to a low note in a gradual, smooth manner, rather than a large step going from a single high note to a single low note, as with the prior art.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention. The words "including" and "having," as used in the specification, including the claims, shall have the same meaning as the word "comprising."

What is claimed is:

1. A game call apparatus, comprising:
   a housing;
   a sounding board coupled to the housing, the sounding board defining a main air channel;
   a reed coupled to the sounding board adjacent the main air channel to produce sounds when air passes through the main air channel;
   a pressure point structure coupled to the housing, the pressure point structure engaging the reed at a reed contact location, the pressure point structure urging the reed toward the sounding board at the reed contact location, the pressure point structure being moveable relative to the reed while the pressure point structure maintains contact with the reed as air is forced across the reed to change the reed contact location on the sounding board to produce different sounds.

2. A game call apparatus according to claim 1 wherein the reed contact location comprises at least two locations.

3. A game call apparatus according to claim 1 wherein the reed contact location comprises more than two locations.

4. A game call apparatus according to claim 1 wherein the reed contact location comprises an infinite number of locations between an initial position and a final position.

5. A game call apparatus according to claim 1 wherein the pressure point structure slidingly engages the reed between an initial contact location and an end contact location.

6. A game call apparatus according to claim 1 wherein the reed comprises a free end having a length, wherein the length of the free end changes in direct relation to changes in the reed contact location.

7. A game call apparatus according to claim 1 wherein the main air channel comprises an inlet, and further comprising a bellows formed about the inlet, the bellows being compressible to generate an airflow through the main air channel and across the reed to produce sounds.

8. A game call apparatus according to claim 1 wherein the main air channel comprises an inlet, and further comprising a bellows formed about the inlet, the bellows being compressible to generate an airflow through the main air channel and across the reed to produce sounds, the pressure point structure being movable by a user through the bellows upon compression of the bellows to change the reed contact location and the sounds produced by the reed.

9. A game call apparatus according to claim 1 wherein the main air channel comprises an inlet, and further comprising a bellows formed about the inlet, the bellows being compressible to generate an airflow through the main air channel and across the reed to produce sounds, the pressure point structure being slidable at infinitely variable locations along the reed, the pressure point structure being movable by a user through the bellows upon compression of the bellows to change the reed contact location and the sounds produced by the reed.

10. A game call apparatus according to claim 1 wherein the reed comprises a reed width and wherein the pressure point structure comprises a lip having a lip width, the lip width being approximately equal to the reed width.

11. A game call apparatus according to claim 1 wherein the pressure point structure slidingly engages the reed at infinitely variable locations between an initial contact position and an end contact position, and further comprising an adjustment system to change the initial contact position and thus change the sounds produced by the reed.

12. A game call apparatus, comprising:
   a housing;
   a sounding board coupled to the housing, the sounding board defining a main air channel;

a reed coupled to the sounding board adjacent the main air channel to produce sounds when air passes through the main air channel;

a pressure point structure coupled to the housing, the pressure point structure engaging the reed at a reed contact location, the pressure point structure urging the reed toward the sounding board at the reed contact location, the pressure point structure being moveable relative to the reed as air is forced across the reed to change the reed contact location on the sounding board to produce different sounds;

wherein the pressure point structure slidingly engages the reed between an initial contact position and an end contact position, and further comprising a bias member which urges the pressure point structure toward the initial contact position, the bias member being overcome by an activating force applied to the pressure point structure to slide the pressure point structure relative to the reed to produce different sounds.

13. A method of using a game call, comprising:

providing a housing;

providing a sounding board integrated within the housing, the sounding board defining a main air channel;

providing a reed secured to the sounding board adjacent the main air channel to produce sounds when air passes through the main air channel;

providing a pressure point structure coupled to the housing, the pressure point structure engaging the reed at a reed contact location, the pressure point structure urging the reed toward the sounding board at the reed contact location;

sliding the pressure point structure along the reed to change the reed contact location while using the game call to produce different sounds.

14. The method of claim 13 wherein the pressure point structure being moveable relative to the reed to change the reed contact location, and wherein changing the reed contact location comprises moving the pressure point structure relative to the reed.

15. The method of claim 13, further comprising sliding the pressure point structure along the reed to change the reed contact location.

16. The method of claim 13, further comprising providing at least two reed contact locations.

17. The method of claim 13, further comprising providing more than two reed contact locations.

18. The method of claim 13, further comprising providing an infinitely variable number of reed contact locations between an initial reed contact location and an end reed contact location.

19. The method of claim 13 wherein the reed comprises a free end having a length;

changing the length of the free end by changing the reed contact location to vary the sounds produced by the reed.

20. The method of claim 13 wherein the main air channel comprises an inlet;

providing a bellows formed about the inlet;

compressing the bellows to generate an airflow through the main air channel and across the reed to produce sounds.

21. The method of claim 13 wherein the main air channel comprises an inlet;

providing a bellows formed about the inlet;

compressing the bellows to generate an airflow through the main air channel and across the reed to produce sounds;

engaging the pressure point structure through the bellows upon compression of the bellows;

slidably moving the pressure point structure along the reed at infinitely variable locations to change the reed contact location and the sounds produced by the reed.

22. The method of claim 13, further comprising slidingly engaging the reed with the pressure point structure at infinitely variable locations between an initial contact location and an end contact location;

adjusting the initial contact location applied by the pressure point structure to change the sounds produced by the reed.

23. A method of using a game call, comprising:

providing a housing;

providing a sounding board integrated within the housing, the sounding board defining a main air channel;

providing a reed secured to the sounding board adjacent the main air channel to produce sounds when air passes through the main air channel;

providing a pressure point structure coupled to the housing, the pressure point structure engaging the reed at a reed contact location, the pressure point structure urging the reed toward the sounding board at the reed contact location;

changing the reed contact location while using the game call to produce different sounds further comprising sliding the pressure point structure along the reed between an initial contact location and an end contact location;

providing a bias member operatively coupled to the pressure point structure, the bias member urging the pressure point structure toward the initial contact location;

applying a force to the bias member to slide the pressure point structure along the reed toward the end contact location to produce different sounds.

24. A method of using a game call, comprising:

providing a housing;

providing a sounding board integrated within the housing, the sounding board defining a main air channel;

providing a reed secured to the sounding board adjacent the main air channel to produce sounds when air passes through the main air channel;

providing a pressure point structure coupled to the housing, the pressure point structure engaging the reed at a reed contact location, the pressure point structure urging the reed toward the sounding board at the reed contact location;

changing the reed contact location while using the game call to produce different sounds wherein the main air channel comprises an inlet;

providing a bellows formed about the inlet;

compressing the bellows to generate an airflow through the main air channel and across the reed to produce sounds;

engaging the pressure point structure through the bellows upon compression of the bellows to change the reed contact location and the sounds produced by the reed.

25. A game call apparatus, comprising:

a housing;

a sound-producing reed secured within the housing;

a bellows enclosing a volume of air upstream of the sound producing reed, the bellows being compressible to force a portion of the volume of air across the sound-producing reed to produce sounds;

a pressure point structure, the pressure point structure being selectively and continuously engageable with the sound-producing reed to produce different sounds, the pressure point structure engaging the reed at multiple locations along the sound-producing reed.

26. A game call apparatus according to claim 25 wherein the multiple locations comprises at least two.

27. A game call apparatus according to claim 25 wherein the multiple locations comprises more than two.

28. A game call apparatus according to claim 25 wherein the multiple locations comprises an infinite number of locations between an initial position and a final position.

29. A game call apparatus according to claim 25 wherein the pressure point structure slidingly engages the reed between an initial contact location and an end contact location.

30. A game call apparatus according to claim 25 wherein the pressure point structure contacts the reed at a reed contact location, the reed comprises a free end having a length, wherein the length of the free end changes in direct relation to changes in the reed contact location.

31. A game call apparatus according to claim 25 wherein the reed comprises a reed width and wherein the pressure point structure comprises a lip having a lip width, the lip width being approximately equal to the reed width.

32. A game call apparatus according to claim 25 wherein the pressure point structure slidingly engages the reed at infinitely variable locations between an initial contact position and an end contact position, and further comprising an adjustment system to change the initial contact position and thus change the sounds produced by the reed.

33. A game call apparatus according to claim 25 wherein the pressure point structure is infinitely variably engageable with the sound-producing reed between two points along the sound producing reed.

34. A game call apparatus according to claim 25 wherein the pressure point structure comprises a lip comprising an edge for engaging the reed.

35. A game call apparatus according to claim 25 wherein the pressure point structure comprises a lip comprising an edge for engaging the reed, a lip slidingly engaging the reed to change tones produced by the game call.

36. A game call apparatus, comprising:

a housing;

a sound-producing reed secured within the housing;

a bellows enclosing a volume of air upstream of the sound producing reed, the bellows being compressible to force a portion of the volume of air across the sound-producing reed to produce sounds;

a pressure point structure, the pressure point structure being selectively engageable with the sound-producing reed to produce different sounds, the pressure point structure engaging the reed at multiple locations along the sound-producing reed;

wherein the pressure point structure slidingly engages the reed between an initial contact position and an end contact position, and further comprising a bias member which urges the pressure point structure toward the initial contact position, the bias member being overcome by an activating force applied to the pressure point structure to slide the pressure point structure relative to the reed to produce different sounds.

37. A method of producing sounds similar to sounds of game animals, comprising:

providing a game call comprising a housing, a sound-producing reed, and a bellows, the bellows enclosing a volume of air upstream of the sound-producing reed;

providing a pressure point structure within the housing, the pressure point structure slidingly engaging the sound-producing reed;

compressing the bellows to force air across the sound-producing reed to produce a sound;

engaging the sound producing reed with the pressure point structure while air is passing over the sound-producing reed to change the sound produced by the sound-producing reed;

sliding the pressure point structure relative to the sound-producing reed while air is passing over the sound-producing reed to change the sound produced by the sound producing reed.

38. The method of claim 37, wherein the pressure point structure contacts the reed at a reed contact location, further comprising sliding the pressure point structure along the reed to change the reed contact location.

39. The method of claim 37, further comprising providing at least two reed contact locations.

40. The method of claim 37, further comprising providing more than two reed contact locations.

41. The method of claim 37, further comprising providing an infinitely variable number of reed contact locations between an initial reed contact location and an end reed contact location.

42. The method of claim 37 wherein the pressure point structure contacts the reed at a reed contact location, wherein the reed comprises a free end having a length;

changing the length of the free end by changing the location of the reed contact location to vary the sound produced by the reed.

43. The method of claim 37, further comprising a main air channel, wherein the main air channel comprises an inlet;

compressing the bellows to generate an airflow through the main air channel and across the reed to produce sounds.

44. The method of claim 37 wherein the pressure point structure contacts the reed at a reed contact location, further comprising a main air channel, wherein the main air channel comprises an inlet;

compressing the bellows to generate an airflow through the main air channel and across the reed to produce sounds;

engaging the pressure point structure through the bellows upon compression of the bellows to change the reed contact location and the sound produced by the reed.

45. The method of claim 37 wherein the pressure point structure contacts the reed at a reed contact location, further comprising a main air channel, wherein the main air channel comprises an inlet;

compressing the bellows to generate an airflow through the main air channel and across the reed to produce sounds;

engaging the pressure point structure through the bellows upon compression of the bellows;

slidably moving the pressure point structure along the reed at infinitely variable locations to change the reed contact location and the sound produced by the reed.

46. A method of producing sounds similar to sounds of game animals, comprising:

providing a game call comprising a housing, a sound-producing reed, and a bellows, the bellows enclosing a volume of air upstream of the sound-producing reed;

providing a pressure point structure within the housing, the pressure point structure being selectively engageable with the sound-producing reed;

compressing the bellows to force air across the sound-producing reed to produce a sound;

engaging the sound producing reed with the pressure point structure while air is passing over the sound-producing reed to change the sound produced by the sound-producing reed;

moving the pressure point structure relative to the sound-producing reed while air is passing over the sound-producing reed to change the sound produced by the sound producing reed;

further comprising sliding the pressure point structure along the reed between an initial contact position and an end contact position;

providing a bias member operatively coupled to the pressure point structure, the bias member urging the pressure point structure toward the initial contact position;

applying a force to the bias member to slide the pressure point structure along the reed toward the end contact position to produce different sounds.

47. A game call apparatus, comprising:

a housing;

a sound-producing reed secured within the housing;

a bellows enclosing a volume of air upstream of the sound producing reed, the bellows being compressible to force a portion of the volume of air across the sound-producing reed to produce sounds;

an aperture formed in the bellows, the aperture allowing air to escape when the bellows is inadvertently compressed to prevent the game call from producing sounds.

48. A game call apparatus according to claim 47, further comprising a raised rib encircling the aperture to help seal around the aperture when the aperture is covered to produce sounds.

49. A game call apparatus according to claim 47, further comprising a plurality of raised, concentric ribs encircling the aperture to help seal around the aperture when the aperture is covered to produce sounds.

50. A game call apparatus according to claim 47, further comprising a depressed area formed in the bellows at a location corresponding to the aperture to make the aperture easier for a user to find when using the game call.

51. A game call apparatus according to claim 47, further comprising a raised rib encircling the aperture to help seal around the aperture when the aperture is covered to produce sounds, and further comprising a depressed area formed in the bellows at a location corresponding to the aperture and the raised rib to make the aperture and raised rib easier for a user to find when using the game call.

52. A game call apparatus, comprising:

a housing;

a sounding board coupled to the housing, the sounding board defining a main air channel;

a reed coupled to the sounding board adjacent the main air channel to produce sounds when air passes through the main air channel;

a sliding reed contact structure coupled to the housing to engage the reed and urge the reed toward the sounding board at a reed contact location, the sliding reed contact structure being slidable along the reed during operation of the game call to change sounds produced by the game call.

53. A game call apparatus, comprising:

a reed assembly comprising an air channel, a reed coupled immediately adjacent the air channel, and a sliding reed contact structure to engage the reed, the sliding reed contact structure being slidable along the reed during operation of the game call to change sounds produced by the game call.

54. A game call apparatus, comprising:

a reed assembly comprising an air channel, a reed coupled immediately adjacent the air channel, and a continuously movable reed contact structure engaging with the reed, the reed contact structure being in continuous contact with the reed and continuously movable relative to the reed during operation of the game call to change sounds produced by the game call.

55. A game call apparatus, comprising:

a reed assembly comprising an air channel, a reed coupled immediately adjacent the air channel, and a single, movable reed contact structure to engage the reed, the single reed contact structure being movable relative to the reed during operation of the game call to change sounds produced by the game call.

56. A method of using a game call, comprising:

providing a reed assembly comprising an air channel and a reed coupled immediately adjacent the air channel;

providing a reed contact structure to engage the reed and create an effective length of the reed;

maintaining continuous contact between the reed and the reed contact structure;

moving the reed contact structure relative to the reed during operation of the game call to change the effective length of the reed and thus change sounds produced by the game call.

57. A method of using a game call, comprising:

providing a reed assembly comprising an air channel, a reed coupled immediately adjacent the air channel, and a reed contact structure to engage the reed;

engaging the reed with the reed contact structure;

sliding the reed contact structure along the reed during operation of the game call to change sounds produced by the game call.

58. A method of using a game call, comprising:

providing a game call;

providing a sound-producing reed within the game call to produce sounds when air is passing through the game call;

providing a reed contact structure within the game call to engage the reed;

moving the reed contact structure relative to the reed while maintaining engagement between the reed and the reed contact structure to continuously change the sounds produced by the game call.

59. A method of using a game call, comprising:

providing a reed assembly comprising an air channel, a reed coupled immediately adjacent the air channel, and a reed contact structure to engage the reed;

engaging the reed with the reed contact structure;

changing an effective length of the reed by moving the reed contact structure relative to the reed while the reed contact structure maintains contact with the reed during operation of the game call to change sounds produced by the game call.

60. A method of using a game call, comprising:

providing a reed assembly comprising an air channel, a reed coupled immediately adjacent the air channel, and a single, movable reed contact structure to engage the reed;

moving the single reed contact structure relative to the reed during operation of the game call to change sounds produced by the game call.

* * * * *